United States Patent [19]

Wolff et al.

[11] Patent Number: 5,082,895

[45] Date of Patent: Jan. 21, 1992

[54] HIGH SOLIDS, LARGE PARTICLE SIZE LATEX COMPOSITIONS

[76] Inventors: Doris Wolff, 414 Sherman, Park Forest, Ill. 60466; Clois E. Powell, 450 Lowell Dr., Highland Heights, Ohio 44143

[21] Appl. No.: 539,295

[22] Filed: Jun. 18, 1990

Related U.S. Application Data

[63] Continuation of Ser. No. 292,595, Dec. 30, 1988, abandoned.

[51] Int. Cl.$^5$ .............................................. C08L 33/08
[52] U.S. Cl. .................................... 524/820; 524/823
[58] Field of Search ................................ 524/820, 823

[56] References Cited

U.S. PATENT DOCUMENTS 3,296,175  1/1967  Fantl et al. ........................... 524/820
4,766,187  8/1988  Beckley et al. ...................... 526/209

OTHER PUBLICATIONS

Rohm and Haas Company, Polymers, Resins and Monomers, Maincote TM HG-54, Jun. 1985, pp. 1-17.

Primary Examiner—Joseph L. Schofer
Assistant Examiner—Jeffrey T. Smith

[57] ABSTRACT

This invention relates to high solids, large particle size latexes useful as, and in, corrosion resistant coating compositions.

6 Claims, No Drawings

HIGH SOLIDS, LARGE PARTICLE SIZE LATEX COMPOSITIONS

This is a continuation of copending U.S. Pat. application Ser. No. 07/292,595 filed on Dec. 30, 1988 now abandoned.

BACKGROUND OF THE INVENTION

This invention relates to high solids, large particle size latex compositions particularly useful in corrosion resistant coatings and paint compositions.

Latexes are suspensions of small particles in water. The particles can be natural or synthetic polymers such as rubber, plastics, and acrylics. Illustrative natural and synthetic polymers include latexes which are dispersions, emulsions, suspensions or the like of the following representative polymers: acrylics; vinyl acetate homopolymers or copolymers such as copolymers with acrylates or ethylene; homopolymers and copolymers of styrene including: styrene-butadiene, carboxylated styrene-butadiene, polystyrene and copolymers of styrene and unsaturated acid anhydrides such as maleic anhydrides; polyvinyl alcohol; natural rubber; synthetic rubbers such as butyl rubber, chlorinated or hydrochlorinated rubber latex, and isoprene rubber latex; gums; homopolymers and copolymers of vinyl halides such as vinyl chloride, and vinylidene chloride, with each other or with acrylonitrile or vinyl esters such as vinyl acetate; homopolymers and copolymers of acrylic and methacrylic acid and their esters and derivatives with or without other monomers having $C{=}C$ groups; polybutadiene; polyisoprene; olefinic resins such as polyethylene, polypropylene, etc.; carboxylated natural and synthetic latexes and similar polymeric materials. These latexes may also be modified with alkyd materials as is well known in the art.

Latexes are formed through the process of emulsion polymerization. Emulsion polymerization is a free radical addition polymerization process and, as such, retains the gross characteristics of other addition reactions, including the major sequences of initiation, propagation, and termination.

A common guideline for the preparation of stable, non-gelling latexes which are useful as corrosion resistant coatings is that it is generally accepted that the smaller the particle size of the latex the better the film performance in areas such as salt spray resistance and corrosion inhibition. Particle sizes under about 0.1 micron are considered acceptable. Larger particle size latexes typically do not provide the desired corrosion resistance that smaller particle size latexes provide.

There is a direct relationship between the particle size of the latex and the solids content of the latex. The smaller the particle size, the lower the solids content. It is possible to formulate higher solids latexes that have small particle sizes; however, these latexes typically experience extremely high viscosity, tend to gel, and are unstable for their intended purpose. Thus, all commercially available corrosion resistant latexes are small particle size latexes having lower solids contents. A typical corrosion resistant latex contains less than 50% non-volatile materials (NVM), and more than likely contains about 40% NVM.

As stated above, typical latexes suitable for use as and in corrosion resistant coatings and paints have small particle sizes, generally below about 0.1 microns, and have low solids contents generally about 40% NVM. However, a high solids content latex, if stable, would be much more preferred than a lower solids content latex because the high solids content solves many problems associated with paint and coating production. To date, a high solids latex has not been commercially prepared due to the expected disadvantage in corrosion resistance performance from the larger sized particles. Formulating a smaller particle size latex to be higher in solids content typically results in poor rheology, high viscosity, and/or gelling problems, especially when combined with pigments and other standard ingredients found in coatings and paints.

The advantages of a stable higher solids content latex include the ability to incorporate additional ingredients such as reactive pigments and the like using a grind phase which does not contain latex, or only a very small percentage of latex with water. Typically, with lower solids content latexes, a latex/water combination is necessary in the grind phase to produce a coating or paint which has desirable rheological and viscosity properties. The advantage to using water alone in the grind phase is that there is no agglomeration reaction between pigments and latex under the high shear conditions of the grind. Another advantage to using water alone in the grind phase is that the ground pigment can be processed to a smaller particle size resulting in a more stable paint composition. Furthermore, the grind time can be reduced to as little as 25% of the time that would be needed if using a lower solids content latex with a latex/water grind phase. In addition to grinding advantages, the increase in solids content of the latex means a reduction in the amount of water in the latex, resulting in a lowering of the cost of transportation and storage of the latex.

The latexes of the present invention are high solids content large particle size latexes which, when used as, or incorporated into, paint and coating formulations, provide corrosion resistance performance results equivalent to or better than conventional low solids content, small particle size latexes without experiencing the problems associated with larger particle size latexes.

SUMMARY OF THE INVENTION

This invention relates to corrosion resistant high solids, large particle size latex coatings and coating compositions containing them. The latexes of this invention do not experience stability problems normally associated with high solids or large particle size latexes. These latexes result from a novel combination of manufacturing and production techniques using specific latex ingredients in specific percentages.

In particular, the latexes of this invention are emulsions of acrylic polymers in water. They have a solids content greater than about 50% NVM, preferably equal to or greater than about 55% NVM, and they have a Joyce-Loebl Disk Centrifuge (JLDC) Average Particle Number Diameter of at least about 0.20 micron, preferably from about 0.22 micron to about 0.26 micron, and a JLDC Average Particle Volume Diameter of at least 0.20 micron, preferably from about 0.25 micron to about 0.31 micron. The glass transition temperature ($T_g$) of these latexes is calculated at $T_g$ onset between about $-10°$ C. and $50°$ C. and $T_g$ inflection between about $0°$ C. and $60°$ C. Their viscosity, when measured at $25°$ C. and about 55% non-volatile materials is less than about 150 centipoise using the Brookfield LVT at 30 rpm with Spindle #1.

Particularly preferred latexes of this invention comprise an emulsion of water with a polymer comprising the reaction product of from about 35-50% 2-ethylhexyl acrylate, from about 30-45% styrene, from about 5-15% methyl methacrylate, from about 2-10% acrylonitrile and from about 0.5-5% acrylic or methacrylic acid, all percentages based on the total monomer content.

It is an object of this invention to provide latex compositions having high solids content and large particle size which do not experience the problems normally associated with high solids content, large particle size latexes.

It is another object of this invention to provide latex compositions which improve the conditions and eliminate many of the problems associated with preparing coatings using lower solids content, smaller particle size latexes.

It is a further object of this invention to provide corrosion resistant coatings and paint compositions containing these novel latexes.

DETAILED DESCRIPTION OF THE INVENTION

There are four essential components to an emulsion polymerization reaction: water, monomer, surfactant and initiator. To begin the emulsion polymerization reaction, a water soluble surfactant is added to the aqueous phase. Such surfactants are typically used in concentrations which are sufficient to allow the surfactant molecules to form micelles, however, more or less surfactant is typically used with differing product results. When water insoluble monomer is added to the solution, it is distributed between three locations. Some of the monomer exists in discrete droplets which are stabilized by adsorption of some of the surfactant at the monomer-water interface. A small portion of the monomer is present as dissolved solute in water. Another portion of the monomer enters the interior of the micelles and swells them until an equilibrium is reached between micellar size and the forces of surface tension at the micelle surface. If the surfactant is present in an amount less than the critical micelle concentration (CMC), the monomer is present primarily as stabilized, discrete droplets with some monomer present as dissolved solute. The concentration of micelles will be negligible.

An initiator is then added to the solution. This initiator decomposes into free radicals by either thermal, chemical or light action. The free radicals are highly reactive and attack the monomer present as dissolved solute. Growing polymer chains are thus initiated and add further monomer units from the dissolved monomer until they are long enough to have surface active properties. At this time they diffuse to the monomer-water interface. Because of the large difference in surface area between micelles and monomer droplets, diffusion is much more likely to occur at the micelle-water interface. Once in the micelles or droplets, the radicals rapidly polymerize the monomer. If the concentration of micelles is relatively low, the number of micelle-initiated polymer particles is lower and further diffusion is also likely to occur at the droplet-water interface. As monomer is used up, it is continuously replaced by diffusion of new monomer. After polymerization proceeds for a period of time, the growth and size of each particle requires additional surfactant to remain stable. Micelles are depleted, and those micelles not attacked by free radicals are utilized for their surfactant. Eventually, there are no micelles left. Eventually, no new particles can be formed and existing particles can only continue to grow in size. The reaction is characterized by continued growth of existing particles, fed by monomer from the droplets dispersed in the aqueous phase. When the monomer in the aqueous phase is exhausted, the reaction slows considerably, continuing only so long as the monomer dissolved in the polymer particles continues to be polymerized.

Final latex particle size is dependent on several factors. It is a function of the number of particles initiated since the more particles that are formed, the smaller the final particle size. The number of particles formed in turn depends on the type and concentration of surfactant, the electrolyte concentration, the rate of radical generation, and therefore the initiator concentration, the type and intensity of agitation, as well as several other variables. Larger particle size latexes will result from those polymerizations that have lower initial surfactant concentrations and/or less rapid initiator decomposition. To create smaller particle sizes, one need only increase the surfactant concentration. In addition, the more free radicals, the faster the rate of chain termination and the smaller the average molecule weight. The less free radicals, the larger the average molecule weight. In addition, temperature has been shown to affect the resultant particle size. An increase in temperature generally decreases the particle size.

Particle size can be measured in several different ways well known in the art. In the present invention, particle size is measured according to the Joyce-Loebl Disk Centrifuge Method (JLDC), although other methods can be used. The JLDC is a particle size measuring instrument. The principle theory is to inject a dispersion of particles onto a spinning fluid contained in the cavity of the disk and a photodetector placed at a known distance from the injection point will measure the turbidity of the particles as they pass through the spinning fluid over time. A dispersion is made by taking three drops of the latex sample and diluting it in 30% v/v methanol/water. The dispersion is then placed in a sonic bath for about 5 minutes. The spinning fluid used is triple distilled water. Analysis of the latex is accomplished by spinning the disk at 8000 rpm and injecting about 15 ml of the spinning fluid into the cavity of the disk. About 1 ml of methanol is added to form a buffer zone. About 1 ml of the latex dispersion is then injected onto the surface of the buffer zone. As the particles pass the photodetector, the computer measures the change in voltage (turbidity of particles blocking light to the photodetector) and the time interval it takes for those particles to pass by the detector. When the total sample has passed the detector, the data is normalized to arrive at particle size figures.

SURFACTANT

Choice of surfactant is probably the most difficult aspect of emulsion polymerization. The requirements for surfactant performance include micelle formation, solubilization of monomer, stabilization of monomer droplets and the growing polymer particles, and stabilization of the final emulsion polymer. In addition, choice of surfactant must also be dictated by the desired properties of the final particle size, molecular weight, mechanical and h stability, foaming characteristics, water sensitivity, corrosion resistance, gloss and many other characteristics. The importance of each of these factors varies with the system of interest and the application. A balance must be reached. The amount of surfactant used also determines to what extent micellar structures are present. Lesser amounts of means fewer micelles. Fewer micelles in turn means more particles of larger size. Consequently, an increase in surfactant concentration will lead to smaller particle size latexes.

Both ionic and nonionic surfactants are commonly used in emulsion polymerization. In general, cationic surfactants are least desirable and are rarely used in paint formulations. Anionic surfactants are most common because they have low critical micelle concentrations and are very effective in reducing surface tension at low concentrations. Typical anionic surfactants include salts of $C_8$-$C_{18}$ carboxylic acids, alkyl and arylalkyl sulfates and sulfonates, ethoxylated sulfates and sulfonates, phosphates, succinates, and salts of polymeric acid derivatives. Nonionic surfactants are also often used in emulsion polymerization. These materials are usually ethoxylated alkyl alcohols or alkyl phenols having alkyl chain lengths of 8 or higher. The characteristics of these surfactants vary widely with the degree of ethoxylation, the lower homologues (about 1-5 ethylene oxide units) being more oil soluble and the higher ethoxylated types being more water soluble. Combinations of anionic and nonionic surfactants can be made to obtain a desired blend of properties.

In the present invention, the preferred surfactants are anionic and are selected from the group consisting of alkyl sodium sulfosuccinates. Most preferred is sodium dihexyl sulfosuccinate. This surfactant is commercially available from the American Cyanamid Company, Wayne, N.J. USA, under the trade name Aerosol(R) MA-80. The surfactant should be used in an amount approximately 50-95% of the critical micelle concentration. For sodium dihexyl sulfosuccinate, the amount of surfactant used is from about 0.3% to about 0.55% based on total monomer content by weight. This is below the critical micelle concentration.

INITIATOR

Free radical initiator systems in emulsion polymerization can be divided into two fundamental types: thermal and redox. Thermal initiators are compounds which under heat conditions generate free radicals. Redox initiation systems are based on the fact that the rate of decomposition of highly oxidizing peroxy compounds can be accelerated by reducing agents.

In this invention, the preferred thermal initiators are selected from the group consisting of sodium, potassium and ammonium persulfate, the preferred redox oxidants are selected from the group consisting of persulfates, t-butyl hydroperoxide, hydrogen peroxide and peroxydiphosphates, and the preferred redox reductants are selected from the group consisting of sodium thiosulfate, metals such as ferrous ($Fe^{+2}$) ions, sodium formaldehyde sulfoxylate, hydrosulfites and basic zinc sulfoxylate formaldehyde. Most preferred is ammonium persulfate. The amount of initiator used is from about 0.05% to about 1.0% based on total monomer content by weight, preferably from about 0.1% to about 0.8%.

GLASS TRANSITION TEMPERATURE

The first factor to be taken into account in the choice of a monomer or monomer mixture is the glass transition temperature of the polymer ($T_g$). This is the characteristic temperature at which the system undergoes a change from a hard, brittle material to a softer, more flexible material. $T_g$ is calculated according to methods well known in the art, most notably the Fox equation. Latexes are generally unable to form films at temperatures below the $T_g$. Thus, it is required that the latex be above the $T_g$ at the application and use temperature. A further restriction is placed on the $T_g$ of the latex by the fact that latexes become very soft at temperatures too far above the $T_g$, resulting in poor hardness, blocking, abrasion resistance, dirt resistance, etc. A balance must therefore be obtained. In this invention, to produce a high solids, large particle size corrosion resistant latex having a good balance between flexibility, adhesion and coalescence and hardness, dirt, mildew, stain and corrosion resistance, a calculated $T_g$ onset of between $-10°$ C. and 50° C. and a calculated $T_g$ inflection of between 0° C. and 60° C. is preferred.

MONOMERS

Choice of monomers is largely determined by the end-use requirements of the polymer. As shown above, many natural and synthetic monomers can be used. For purposes of this invention, consideration will be limited to those systems of interest to the coatings industry, primarily acrylics, vinyls and styrene-based products.

Of particular interest to this invention are latexes based upon combinations of acrylates, acrylic acids, and other ethylenically unsaturated monomers such as styrene and acrylonitrile. Many different combinations of these materials exist. Many of these combinations will produce a high solids, large particle size latex. However, it must be stressed that different combinations of ingredients will necessarily exhibit different properties, and that outside of certain ranges and combinations, many of these latexes do not provide the desired rheology, viscosity, film performance and/or film properties. It is very difficult, if not impossible, to predict how the change in one ingredient will affect the final latexes characteristics and/or performance.

For example, either butyl acrylate or 2-ethylhexyl acrylate can be used to create a high solids, large particle size latex. However, it has been found that a formula containing solely 2-ethylhexyl acrylate will exhibit better corrosion resistance than a formula containing solely butyl acrylate. It has also been found that combinations of acrylate monomers can be used. For example, rather than use 2-ethylhexyl acrylate exclusively, one can formulate the latex to contain other acrylate monomers in addition to 2-ethylhexyl acrylate, including butyl acrylate, butyl methacrylate, ethyl acrylate, ethyl methacrylate, hydroxyethyl methacrylate, hydroxypropyl methacrylate, isobornyl methacrylate, isobutyl acrylate, isobutyl methacrylate, isododecyl methacrylate, lauryl methacrylate, methyl acrylate, methyl methacrylate, tridecyl methacrylate, and the like. Most preferred is a combination of 2-ethylhexyl acrylate and another acrylate monomer, preferably methyl methacrylate.

For high solids, large particle size latexes having corrosion resistance properties equal to or better than small particle size latexes, the following guidelines should be observed.

In general, the latex should comprise 2-ethylhexylacrylate, styrene, acrylonitrile, at least one other acrylate monomer, and at least one monomeric acid. The amount of methacrylic acid or acrylic acid, percent acrylonitrile, ratio of styrene to other acrylate and glass transition temperature are four key variables to producing a latex of this invention. Specifically, lower concentrations of methacrylic acid or acrylic acid improve a coatings corrosion resistance. The percentage of methacrylic or acrylic acid should not exceed about 6%, preferably the percentage of acid should not exceed about 3% by weight based on the total monomer content.

In addition, lower percentages of acrylonitrile in such latexes will generally yield better corrosion resistance. In particular, the percentage of acrylonitrile should not be below about 2% and should not exceed about 10% by weight based on the total monomer content, preferably below about 7% by weight.

The ratio of styrene to other acrylate monomer has a decided effect on the corrosion resistance of the latex. An increase in the ratio of styrene to other acrylate monomer will increase the latexes corrosion resistance. However, 100% styrene causes the coating to become unstable and gel. Thus, the ratio of styrene to other acrylate monomer should be at least 50:50 and is preferably at least 70:30, most preferably about 80:20 on a weight basis.

The $T_g$, as stated above, is largely determined by the desired properties of the latex. In the present invention, $T_g$ is targeted at $T_g$ onset of between $-10°$ C. and $50°$ C. and $T_g$ inflection of between $0°$ C. and $60°$ C.

In particular, the present invention comprises a high solids, large particle size latex having greater than 50% non-volatile materials, a JLDC Average Particle Number Diameter of at least about 0.20 micron, preferably between about 0.22 and 0.26 microns, a JLDC Average Particle Volume Diameter of at least about 0.20 micron, preferably between about 0.25 and 0.31 microns, and a calculated $T_g$ onset of between about $-10°$ C. and about $50°$ C., comprising an emulsion of water with the reaction product of from about 35-50% of 2-ethylhexyl acrylate, from about 30-45% of styrene, from about 5-15% of other acrylate monomer, from about 2-10% of acrylonitrile and from about 0.5-6% of acrylic or methacrylic acid, all percentages based on the amount of total monomer present. The viscosity, when measured at $25°$ C. and at about 55% non-volatile materials is less than about 150 centipoise using the Brookfield LVT at 30 rpm with Spindle #1. More preferably, monomeric concentration of from about 37.9-47.9% 2-ethylhexyl acrylate, from about 34.5-44.6% styrene, from about 7.9-11.9% methyl methacrylate, from about 5-7% acrylonitrile, and from about 1.2-2.2% acrylic acid, are desired.

LATEX PREPARATION

To produce such a latex composition, the following procedure is preferred, although it is entirely possible that somewhat different procedures can arrive at a similar end composition.

EXAMPLE I

| Initiator Mix: | 13.15 grams Ammonium Persulfate |
| --- | --- |
| | 205.4 grams deionized Water |
| Monomer Mix: | 939.2 grams 2-ethylhexyl acrylate |
| | 866.9 grams Styrene |
| | 216.6 grams Methyl Methacrylate |
| | 131.5 grams Acrylonitrile |
| | 36.6 grams Glacial acrylic acid |

Charge a 5 liter glass reactor with 1574.7 grams of deionized water, 2.19 grams of sodium bicarbonate buffer and 13.7 grams of anionic surfactant such as sodium dihexyl sulfosuccinate (Tradename Aerosol(R) MA-80, available from American Cyanamid Company, Wayne, N.J., USA). Begin agitation at a moderate rate and continue throughout the reaction. Heat the contents of the reactor to about 78 degrees C. and sparge the system with nitrogen during heat up. When the temperature reaches about 78 degrees C, discontinue the nitrogen sparge. Add 68.5 grams of initiator mix. Wait 10 minutes. Add 219.1 grams of monomer mix. Wait 30 minutes. Feed the remainder of the monomer mix at the rate of 8.2 grams/minute. Five (5) minutes after beginning the monomer addition, feed the remainder of the initiator mix at the rate of 0.56 grams/minute. Upon the conclusion of the monomer mix addition, raise the temperature to about 82 degrees C. Hold the temperature at 82 degrees C. for one hour after the conclusion of the initiator mix addition. Cool the reaction mixture until the temperature is below 30 degrees C. Filter the latex through a 65 micron filter.

The resulting latex has the following properties:

| The resulting latex has the following properties: | |
| --- | --- |
| NVM | 55.2 +/− 1.0% |
| pH | 2.62 +/− 0.2 |
| Wt/gal | 8.6 +/− 0.03 lb/gal |
| Viscosity | Brookfield LVT 30 RPM (25° C.): |
| | 63 +/− 10 cps |
| Grit | Less than 1% based on total monomer |
| Free Monomers: | 0–0.005% Acrylonitrile |
| | 0–0.004% Methyl Methacrylate |
| | 0.002–0.006% Styrene |
| | 0–0.4% 2-Ethylhexyl acrylate |

PARTICLE SIZE PAINT PREPARATION

The latex coatings of this invention can also include other conventional paint ingredients to improve the performance of the coatings. For example, solvents such as glycols can be added to the paints at concentrations up to about 35% by weight to act as coalescing solvents. Conventional additives such as surfactants, microbiocides, conventional thickeners, dispersants, wetting agents, defoamers, flow agents and the like can also be added as is well known in the art. Normally, the coating compositions will also contain pigmentation. Typical pigments include titanium dioxide, clays, zinc oxide, carbon black, mica, silicas, calcium carbonate, phthalocyanine blue and green pigments, chrome yellow pigments and the like.

One preferred procedure for formulating paints containing the latexes of this invention is as follows: EXAMPLE II

| Prethin Phase | 411.94 | Latex of Example I |
| --- | --- | --- |
| | 2.07 | Aqueous Ammonia |
| | 5.01 | Triton X-405 Surfactant (Rohm & Haas) |
| | 3.00 | Defoamer |
| | 10.17 | Ethylene Glycol |
| | 15.17 | 2-butoxyethoxyethanol |
| Grind Phase | 110.14 | Water |
| | 0.61 | Sodium Nitrate |
| | 8.28 | Rohm & Haas QR-681 Pigment Dispersant |
| | 1.23 | Triton X-405 (Rohm & Haas) |
| | 3.00 | Emulsified Silicone |
| | 298.38 | Wet Ground Calcium Carbonate |
| | 52.59 | Barium Metaborate |
| | 101.69 | Titanium Dioxide |
| Wash Phase | 82.22 | Water |
| Thindown Phase | 31.90 | Texanol-12-Carbon Ester Alcohol |
| | 4.01 | Rohm & Haas QR-708 Rheology Modifier |
| | 1.00 | HydroxyEthyl Cellulose |

| | -continued |
|---|---|
| 3.27 | Aqueous Ammonia |

Procedure

Mix the Prethin Phase components in a tank equipped with agitator. Grind the pigment and additives shown above in the Grind Phase for approximately 10 minutes in an appropriate vessel. Add the Grind Phase to the Prethin tank. Continue agitation. Wash the Grind Phase vessel with the Wash Phase and add this to the Prethin tank. Add the Thindown Phase to the Prethin tank while agitating.

PERFORMANCE VERSUS LOW SOLIDS, SMALL PARTICLE SIZE LATEXES

The corrosion resistance of the high solids, large particle size latex of this invention has been tested against a commercially available low solids, small particle size latex using a Salt Spray Resistance test described by ASTM B 117. The size and degree of blistering of the coating was measured using ASTM D 714-56 and the degree of panel rusting was measured using ASTM D 610-68.

The low solids, small particle size latex used as a comparison is commercially available from Rohm & Haas Company under the designation HG-54. The composition of HG-54 appears to be about 23% styrene, 51% 2-ethylhexyl acrylate, 22% acrylontrile and either 4% methacrylic acid or 3.5% acrylic acid by weight. HG-54 contains by weight approximately 42% non-volatile materials. HG-54 has a mean diameter particle size of about 75 nanometers, that is, about 0.075 microns.

Subjecting otherwise identical paint formulas to ASTM B 117 for 300 hours produced the following results, a value of 1 being worst (or largest blister size) and a value of 10 being best (or smallest blister size):

| PAINT | LATEX | LATEX NVM | SIZE | BLISTER AMOUNT | RUST | ADHESION |
|---|---|---|---|---|---|---|
| 1 | HG-54 | 42% | 8 | 9 | 9 | 10 |
| 2 | a | 55.4 | 10 | 10 | 10 | 10 |
| 3 | b | 55.4 | 9 | 8 | 9 | 10 |
| 4 | c | 55.1 | 10 | 10 | 10 | 10 |

Latex a: 6% acrylonitrile, 2% methacrylic acid, 42.7% 2-ethylhexyl acrylate, 39.4% styrene, 9.9% methyl methacrylate, by weight, having a Tg onset of about 12° C., a Tg inflection of about 28° C., a JLDC Ave. Particle No. Dia. of about 0.28 micron, a JLDC Ave. Particle Vol. Dia. of about 0.30 micron, and viscosity of 68 cps at 25° C.

Latex b: 6% acrylonitrile, 2% methacrylic acid, 36.7% 2-ethylhexyl acrylate, 44.2% styrene, 11.1% methyl methacrylate, by weight, having a Tg onset of about 20° C., a Tg inflection of about 45° C., a JLDC Ave. Particle No. Dia. of about 0.29 micron, a JLDC Ave. Particle Vol. Dia. of about 0.31 micron, and viscosity of 66 cps at 25° C.

Latex c: 6% acrylonitrile, 1.7% acrylic acid, 42.9% 2-ethylhexyl acrylate, 39.6% styrene, 9.9% methyl methacrylate, by weight, having a Tg onset of about 13° C., a Tg inflection of about 27° C., a JLDC Ave. Particle No. Dia. of about 0.25 micron, a JLDC Ave. Particle Vol. Dia. of about 0.28 micron, and viscosity of 64 cps at 25° C.

What is claimed is:

1. A corrosion resistant latex composition having at least 50% non-volatile materials, a JLDC Average Particle Number Diameter of at least 0.20 micron, a JLDC Average Particle Volume Diameter of at least 0.20 micron, a Tg onset of between about −10° C. and about 50° C., and at 55% non-volatile materials and 25° C. said latex having a viscosity of less than 150 centipoise, comprising an emulsion of water with the reaction product of from about 35-50% of 2-ethylhexyl acrylate, from about 30-45% of styrene, from about 5-15% of at least one other acrylate monomer, from about 2-10% of acrylonitrile and from about 0.5-6% of monomeric acid, all percentages by weight based on the amount of total monomer present.

2. The latex composition of claim 1 wherein said monomeric acid is either acrylic acid, methacrylic acid or mixtures thereof.

3. The latex composition of claim 1 wherein said other acrylate monomers are selected from the group consisting of butyl acrylate, butyl methacrylate, ethyl acrylate, ethyl methacrylate, hydroxyethyl methacrylate, hydroxypropyl methacrylate, isobornyl methacrylate, isobutyl acrylate, isobutyl methacrylate, isododecyl methacrylate, lauryl methacrylate, methyl acrylate, methyl methacrylate, tridecyl methacrylate.

4. The latex composition of claim 3 wherein said other acrylate monomer is methyl methacrylate.

5. The latex composition of claim 1 wherein the JLDC Average Particle Number Diameter is at least 0.22 micron and the JLDC Average Particle Volume Diameter is at least 0.25 micron.

6. A coating composition comprising at least one pigment and a corrosion resistant latex composition having at least 50% non-volatile materials, a JLDC Average Particle Number Diameter of at least 0.20 micron, a JLDC Average Particle Volume Diameter of at least 0.20 micron, a Tg onset of between about −10° C. and about 50° C., and at 55% non-volatile materials and 25° C. said latex having a viscosity less than 150 centipoise, wherein said latex composition comprises an emulsion of water with the reaction product of from about 35-50% of 2-ethylhexyl acrylate, from about 30-45% of styrene, from about 5-15% of at least one other acrylate monomer, from about 2-10% of acrylonitrile and from about 0.5-6% of monomeric acid, all percentages by weight based on the amount of total monomer present.

* * * * *